US010169998B2

(12) United States Patent
Park et al.

(10) Patent No.: US 10,169,998 B2
(45) Date of Patent: Jan. 1, 2019

(54) SYSTEM AND METHOD FOR CONFIGURING LANE NODE TREE

(71) Applicant: Hyundai Motor Company, Seoul (KR)

(72) Inventors: Jong Rok Park, Seoul (KR); Dong Gyu Noh, Gyeonggi-do (KR); Cho Rong Ryu, Incheon (KR); Dae Sung Hwang, Gyeonggi-do (KR); Hahk Rel Noh, Gyeonggi-do (KR); Su Lyun Sung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 15/357,379

(22) Filed: Nov. 21, 2016

(65) Prior Publication Data
US 2018/0033305 A1 Feb. 1, 2018

(30) Foreign Application Priority Data

Aug. 1, 2016 (KR) .................. 10-2016-0097853

(51) Int. Cl.
| G08G 1/01 | (2006.01) |
| G06G 1/16 | (2006.01) |
| H04W 8/00 | (2009.01) |
| G08G 1/133 | (2006.01) |
| H04W 84/18 | (2009.01) |
| G08G 1/16 | (2006.01) |

(52) U.S. Cl.
CPC ........... *G08G 1/163* (2013.01); *G08G 1/0112* (2013.01); *G08G 1/133* (2013.01); *H04W 8/005* (2013.01); *H04W 84/18* (2013.01)

(58) Field of Classification Search
CPC ...... G08G 1/0112; G08G 1/133; H04W 8/005
USPC .......................................................... 701/117
See application file for complete search history.

(56) References Cited

U.S. PATENT DOCUMENTS

| 7,102,496 | B1* | 9/2006 | Ernst, Jr. .......... G08G 1/096725 |
| | | | 180/167 |
| 8,914,225 | B2 | 12/2014 | Caskey et al. |
| 9,245,446 | B2 | 1/2016 | Chen et al. |
| 2007/0117525 | A1* | 5/2007 | Osafune ................... G08G 1/20 |
| | | | 455/99 |
| 2012/0039235 | A1 | 2/2012 | Chen et al. |

FOREIGN PATENT DOCUMENTS

| CN | 104010340 A | 8/2014 |
| CN | 104093185 A | 10/2014 |
| JP | 2005-297955 A | 10/2005 |

(Continued)

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

A system for configuring a lane node tree includes: a host vehicle; and a controller disposed in the host vehicle and including a memory configured to store program instructions and a processor configured to execute the stored program instructions, which when executed cause the controller to: select a driving vehicle detection mode among a plurality of driving vehicle detection modes; select a lane of a road according to the selected driving vehicle detection mode; determine whether a neighbor vehicle neighboring the host vehicle is present in the selected lane; and request a node connection from a neighbor vehicle present in the selected lane when the neighbor vehicle is determined to be present in the selected lane.

17 Claims, 10 Drawing Sheets

(56) References Cited

FOREIGN PATENT DOCUMENTS

| | | |
|---|---|---|
| JP | 2007-088583 A | 4/2007 |
| JP | 2009-202711 A | 9/2009 |
| JP | 2010-259089 A | 11/2010 |
| JP | 2013-101010 A | 5/2013 |
| KR | 2009-0054163 A | 5/2009 |
| KR | 10-0932556 B1 | 12/2009 |
| KR | 2015-0133492 A | 11/2015 |

* cited by examiner

SYSTEM AND METHOD FOR CONFIGURING LANE NODE TREE

CROSS-REFERENCE TO RELATED APPLICATION

This application is claims the benefit of and priority to Korean Patent Application No. 10-2016-0097853, filed on Aug. 1, 2016 in the Korean Intellectual Property Office, the disclosure of which is incorporated herein in its entirety by reference as if fully set forth herein.

TECHNICAL FIELD

The present disclosure relates generally to a system and method for configuring a lane node tree, and more particularly, to a technique of configuring a node tree of a linear route and a curved route based on vehicle-to-vehicle (V2V) communication.

BACKGROUND

Vehicle-to-vehicle (V2V) communication is a technology that can be actively utilized in the next-generation fields of traffic safety, telematics, and intelligent traffic systems. Unlike conventional communication technologies between a base station and a terminal, V2V communication is generally performed using communication devices installed in vehicles by establishing a communication network therebetween and through autonomous distribution controlling, without being controlled by a base station.

An IEEE 802.11CSMA/CA (Carrier Sense Multiple Access/Collision Avoidance) scheme, a standard of wireless local area networks (LANs), has been researched as a medium access control (MAC) protocol of V2V communication. A MAC structure basically includes a distributed coordination function (DCF) based on CSMA/CA.

Recent V2V communication employs multi-hop technology enabling a vehicle to perform communication with another vehicle within radio coverage even or a remote vehicle outside radio coverage through relay of an intervening vehicle therebetween. However, multi-hop technology can suffer from excessively large communication loads, as compared with a one-hop-based communication scheme.

SUMMARY

The present disclosure has been made to solve the above-mentioned problems occurring in the related art while advantages achieved by the related art are maintained intact.

Embodiments of the present disclosure provide a system and method for configuring a lane node tree, capable of configuring a node tree on the basis of a neighbor vehicle having an attribute required for an operation candidate application when the operation candidate application is selected on the basis of vehicle driving information in a linear or curved lane.

Technical subjects of the present disclosure are not limited to the foregoing technical subjects, and any other technical subjects not mentioned herein may be easily understood by a person skilled in the art from the present disclosure and accompanying drawings.

According to embodiments of the present disclosure, a system for configuring a lane node tree includes: a host vehicle; and a controller disposed in the host vehicle and including a memory configured to store program instructions and a processor configured to execute the stored program instructions, which when executed cause the controller to: select a driving vehicle detection mode among a plurality of driving vehicle detection modes; select a lane of a road according to the selected driving vehicle detection mode; determine whether a neighbor vehicle neighboring the host vehicle is present in the selected lane; and request a node connection from a neighbor vehicle present in the selected lane when the neighbor vehicle is determined to be present in the selected lane.

The controller may detect the neighbor vehicle neighboring the host vehicle, and detects a lane of the road.

The plurality of driving vehicle detection modes may include a self-lane mode for detecting a vehicle in a lane in which the host vehicle is present, an opposite lane mode for detecting a vehicle in an opposite lane of the lane in which the host vehicle is present, and a left/right lane mode for detecting a driving vehicle of a left or right lane with respect to the lane in which the host vehicle is present.

The self-lane mode may be selected when at least one of a forward collision warning (FCW) application and an emergency electronic brake light (EEBL) application is executed, the opposite lane mode may be selected when at least one of a vehicle-to-everything (V2V) information fusion cooperative adaptive cruise control (CACC) application and a do not pass warning (DNPW) application is executed, and the left/right lane mode may be selected when a blind spot warning (BSW) application is executed.

When the self-lane mode is selected, the controller may determine a lane attribute of a vehicle driving on the road in the same driving direction as the host vehicle and determines whether the vehicle is present in the lane in which the host vehicle is present.

When the vehicle is present in the lane in which the host vehicle is present, the controller may request the node connection from the vehicle present in the lane in which the host vehicle is present.

When the vehicle is not present in the lane in which the host vehicle is present, the controller may request the node connection from a vehicle at a farthest distance from the host vehicle among a plurality of vehicles driving in the same driving direction as the host vehicle.

When the opposite lane mode is selected, the controller may determine a lane attribute of a vehicle driving on the road in the opposite driving direction as the host vehicle and determines whether the vehicle is present in the opposite lane of the lane in which the host vehicle is present.

The controller may request the node connection from the vehicle present in the opposite lane.

When the left/right lane mode is selected, the controller may determine a lane attribute of a vehicle driving on the road in the same driving direction as the host vehicle and determines whether the vehicle is present in a left lane or a right lane with respect to the lane in which the host vehicle is present.

The controller may request the node connection from the vehicle present in the left lane or the right lane with respect to the lane in which the host vehicle is present.

Furthermore, according to embodiments of the present disclosure, a method for configuring a lane node tree using a controller disposed in a host vehicle and including a memory configured to store program instructions and a processor configured to execute the stored program instructions includes: selecting, by the controller, a driving vehicle detection mode among a plurality of driving vehicle detection modes; selecting, by the controller, a lane of a road according to the selected driving vehicle detection mode; determining, by the controller, whether a neighbor vehicle neighboring the host vehicle is present in the selected lane; and requesting, by the controller, a node connection from a neighbor vehicle present in the selected lane when the neighbor vehicle is determined to be present in the selected lane.

The method may further include: requesting, by the controller, node connection from another neighbor vehicle on the road when the neighbor vehicle is not present in the selected lane.

The requesting of the node connection from another neighbor vehicle on the road may include: requesting, by the controller, the node connection from a vehicle at a farthest distance from the host vehicle among a plurality of vehicles driving in the same driving direction as the host vehicle.

The plurality of driving vehicle detection modes may include a self-lane mode for detecting a vehicle in a lane in which the host vehicle is present, an opposite lane mode for detecting a vehicle in an opposite lane of the lane in which the host vehicle is present, and a left/right lane mode for detecting a driving vehicle of a left or right lane with respect to the lane in which the host vehicle is present.

The method may further include: determining, by the controller, a lane attribute of a vehicle driving on the road in the same driving direction as the host vehicle and determining whether the vehicle is present in the lane in which the host vehicle is present, when the self-lane mode is selected; determining, by the controller, a lane attribute of a vehicle driving on the road in the opposite driving direction as the host vehicle and determining whether the vehicle is present in the opposite lane of the lane in which the host vehicle is present, when the opposite lane mode is selected; and determining, by the controller, a lane attribute of a vehicle driving on the road in the same driving direction as the host vehicle and determining whether the vehicle is present in a left lane or a right lane with respect to the lane in which the host vehicle is present, when the left/right lane mode is selected.

Furthermore, according to embodiments of the present disclosure, a method for configuring a lane node tree includes: selecting, by a first vehicle, a first driving vehicle detection mode among a plurality of driving vehicle detection modes; selecting, by the first vehicle, a first lane of a road according to the selected first driving vehicle detection mode; determining, by the first vehicle, whether a second vehicle is present in the selected first lane; requesting, by the first vehicle, a node connection from a second vehicle present in the selected lane when the second vehicle is determined to be present in the selected lane; selecting, by the second vehicle, a second driving vehicle detection mode among the plurality of driving vehicle detection modes; selecting, by the second vehicle, a second lane of the road according to the selected second driving vehicle detection mode; determining, by the second vehicle, whether a vehicle is present in the selected second lane; when a vehicle is not present in the selected second lane, determining, by the second vehicle, whether a vehicle is present in another lane; when a vehicle is not present in the other lane, transmitting, by the second vehicle, node connection information to the first vehicle; and configuring, by the first vehicle, a node tree using the node connection information.

The method may further include: when the vehicle is present in the other lane, transmitting, by the second vehicle, the node connection information to a vehicle at a farthest distance from the second vehicle among a plurality of vehicles.

The plurality of driving vehicle detection modes may include a self-lane mode for detecting a vehicle in a lane in which the host vehicle is present, an opposite lane mode for detecting a vehicle in an opposite lane of the lane in which the host vehicle is present, and a left/right lane mode for detecting a driving vehicle of a left or right lane with respect to the lane in which the host vehicle is present.

BRIEF DESCRIPTION OF THE DRAWINGS

The above and other objects, features and advantages of the present disclosure will be more apparent from the following detailed description taken in conjunction with the accompanying drawings.

Figure 1:
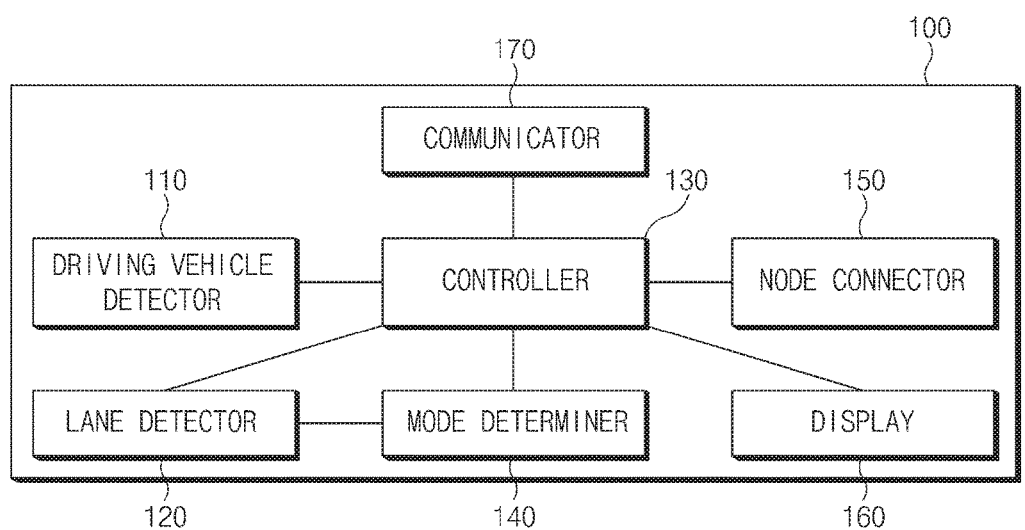
FIG. 1 is a block diagram illustrating a system for configuring a lane node tree according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. Unless indicated otherwise, it is to be understood that all the terms used in the specification, including technical and scientific terms have the same meaning as those that are understood by those skilled in the art to which the present disclosure pertains. It must be understood that the terms defined by the dictionary are identical with the meanings within the context of the related art, and they should not be ideally or excessively formally defined unless the context clearly dictates otherwise.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus or system comprising the controller in conjunction with one or more other components, as would be appreciated by a person of ordinary skill in the art.

Hereinafter, embodiments of the present disclosure will be described in detail with reference to FIGS. 1 to 10.

FIG. 1 is a block diagram illustrating a system for configuring a lane node tree according to embodiments of the present disclosure.

The system 100 for configuring a lane node tree according to embodiments of the present disclosure includes a driving vehicle detector 110, a lane detector 120, a controller 130, a mode determiner 140, and a node connector 150. The controller 130 may control operation of the other components in the system 100.

The driving vehicle detector 110 detects a neighbor vehicle in front of a host vehicle (otherwise referred to herein as an "own vehicle") and has a sensor, or the like. Here, the neighbor vehicle may be detected within a detection range of the sensor or within a communication available range.

The lane detector 120 may detect a lane of a road in which the host vehicle is driving.

The controller 130 determines a lane attribute of the vehicle detected by the driving vehicle detector 110 using the lane detection result. The controller 130 determines whether a vehicle is present in the corresponding lane according to a mode selected (or determined) by the mode determiner 140. When a vehicle is present, the controller requests node connection from the corresponding vehicle through a communicator 170. In a case in which a vehicle is not present in the corresponding lane according to the mode determined by the mode determiner 140, the controller 130 requests node connection from a vehicle present at the farthest distance among neighbor vehicles checked by the driving vehicle detector 110. The controller 130 configures a node tree using node connection information received from a preceding vehicle.

Although not specifically discussed in the present disclosure, the controller 130 may apply the configured node tree to a navigation device, a vehicle safety system, and the like.

The mode determiner 140 determines a driving vehicle detection mode. The driving vehicle detection mode includes a self-lane mode, an opposite lane mode, and a left/right lane mode. The self-lane mode is a mode for configuring a node tree by detecting a vehicle of a lane in which the host vehicle is present (otherwise referred to herein as a "self-lane"). When a forward collision warning (FCW) application or an emergency electronic brake light (EEBL) application is executed, the self-lane mode is selected. The opposite lane mode is a mode for configuring a node tree by detecting a vehicle opposing a host vehicle, i.e., a vehicle driving in a direction toward the host vehicle. When a V2V information fusion cooperative adaptive cruise control (CACC) application or a do not pass warning (DNPW) application is executed, the opposite lane mode is selected. The left/right lane mode is a mode for configuring a node tree by detecting vehicles driving in left and right lanes with respect to a host vehicle. When a blind spot warning (BSW) application is executed, the left/right lane mode is selected.

When a vehicle according to a corresponding mode is detected by the controller 130, the node connector 150 requests node connection from the corresponding vehicle.

A display 160 displays a node tree configured by the controller 130 on a screen.

The communicator 170 performs communication with a neighbor vehicle.

In the present disclosure having the aforementioned configuration, a node tree is configured by detecting a neighbor vehicle in a straight path or a curved path.

Hereinafter, a method for configuring a lane node tree according to embodiments of the present disclosure will be described with reference to FIG. 2. Here, a case in which a first vehicle 10, a second vehicle 20, and a third vehicle drive on a road and the first vehicle 10, as a host vehicle, wants to configure a node tree will be described.

Figure 2:
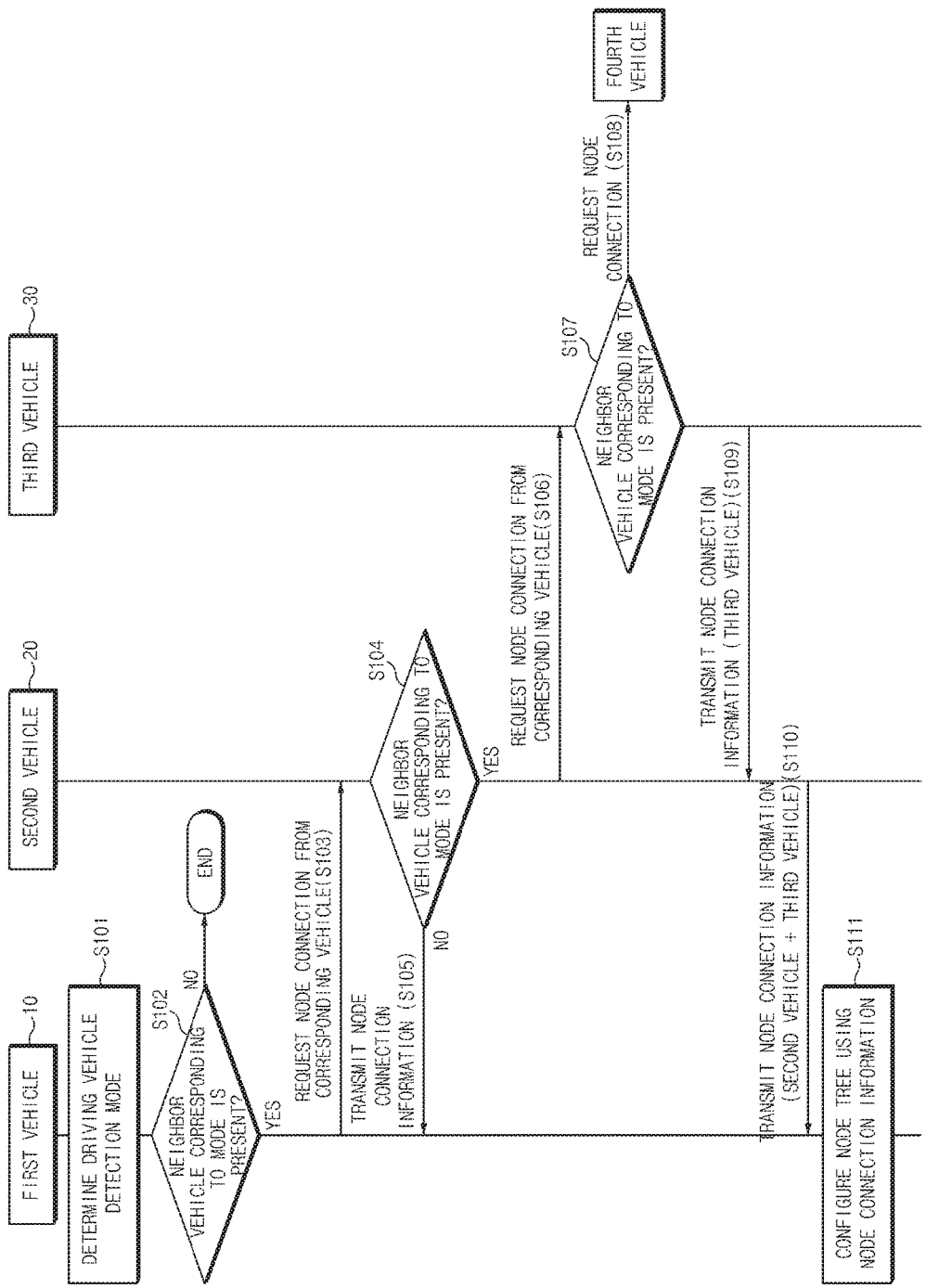
FIG. 2 is a flow chart illustrating a method for configuring a lane node tree according to embodiments of the present disclosure.

As shown in FIG. 2, first, the first vehicle 10 determines a driving vehicle detection mode in operation S101. That is, the first vehicle 10 determines whether a current mode is a self-lane detection mode, an opposite lane detection mode, or a left/right lane detection mode.

Next, the first vehicle 10 determines whether a neighbor vehicle corresponding to the determined mode is present in operation S102. When a neighbor vehicle corresponding to the determined mode is present, the first vehicle 10 requests node connection from the corresponding vehicle in operation S103. In FIG. 2, a case in which the neighbor vehicle corresponding to the mode determined in operation S102 is the second vehicle will be described as an example.

Upon receiving the request for node connection, the second vehicle 20 determines whether a neighbor vehicle neighboring the host vehicle corresponding to the mode is present, like the first vehicle, in operation S104. When a neighbor vehicle is not present, the second vehicle 20 transmits node connection information to the first vehicle 10 in operation S105, and when a neighbor vehicle is present, the second vehicle 20 requests node connection from the corresponding vehicle in operation S106. Here, it is assumed that the corresponding vehicle is the third vehicle, for example. Here, the node connection information includes information regarding node connection of a vehicle to which the second vehicle is connected.

Also, upon receiving the request for node connection, the third vehicle 30 detects a neighbor vehicle to determine whether a neighbor vehicle corresponding to the mode is present, like the first vehicle 10 and the second vehicle 20, in operation S107. When a neighbor vehicle is present, the third vehicle 30 requests node connection from the corresponding vehicle in operation S108, and when a neighbor vehicle is not present, the third vehicle 30 transmits node connection information thereof to the second vehicle 20.

Thereafter, the second vehicle 20 transmits node connection information received from the third vehicle 30 and node connection information thereof to the first vehicle 10 in operation S110.

Figure 5:
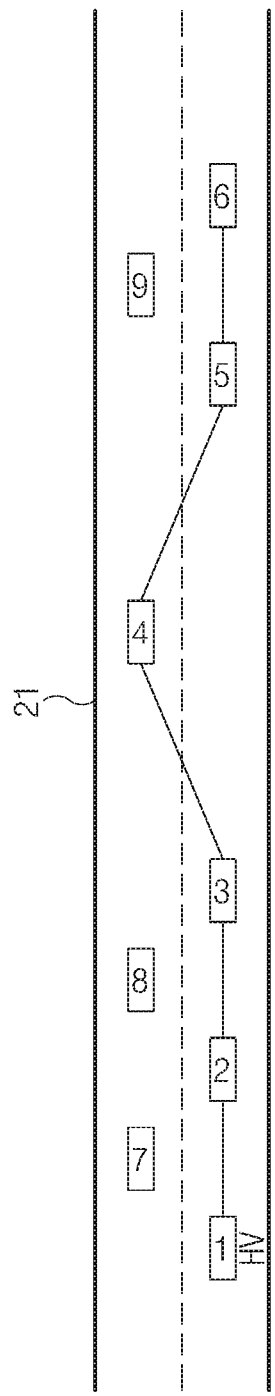
FIG. 5 is a view illustrating a configuration of a node tree through the detection of a vehicle of a self-lane of FIG. 4.
Figure 7:
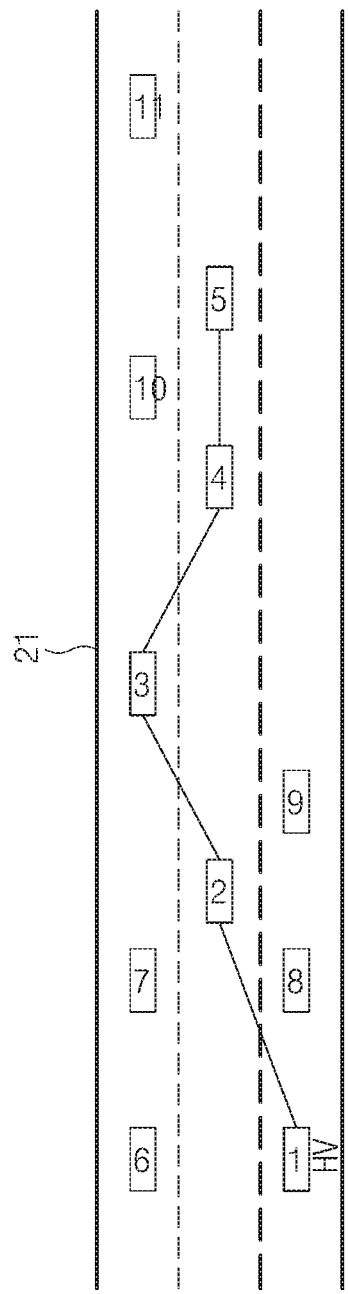
FIG. 7 is a view illustrating a configuration of a node tree through detection of a vehicle of the opposite lane of FIG. 6.
Figure 9:
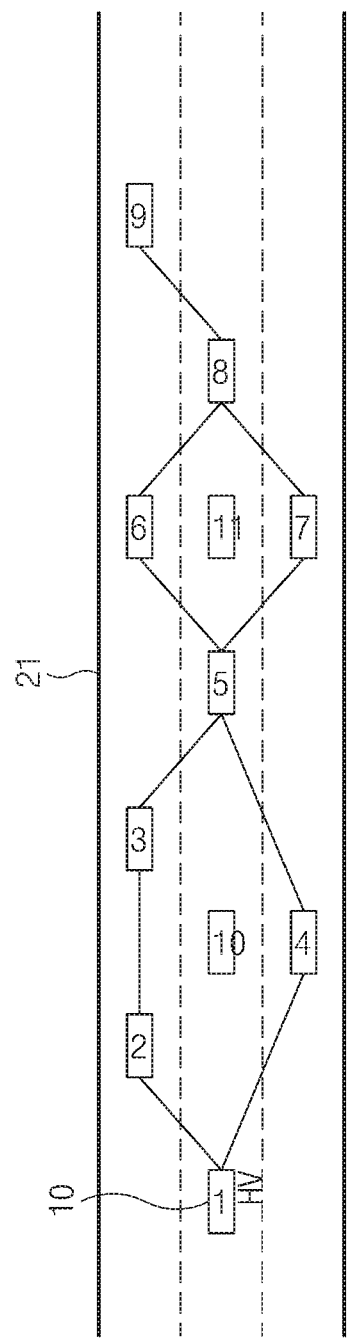
FIG. 9 is a view illustrating a configuration of a node tree through detection of a left/right lane vehicle of FIG. 8.

The first vehicle 10 configures a node tree using the received node connection information as illustrated in FIGS. 5, 7, and 9 in operation S111.

Hereinafter, operations S102, S104, and S107 in which presence of a neighbor vehicle corresponding to the mode (one of the self-lane detection mode, the opposite lane detection mode, and the left/right lane detection mode) determined in FIG. 2 will be described in detail with reference to FIG. 3.

Figure 3:
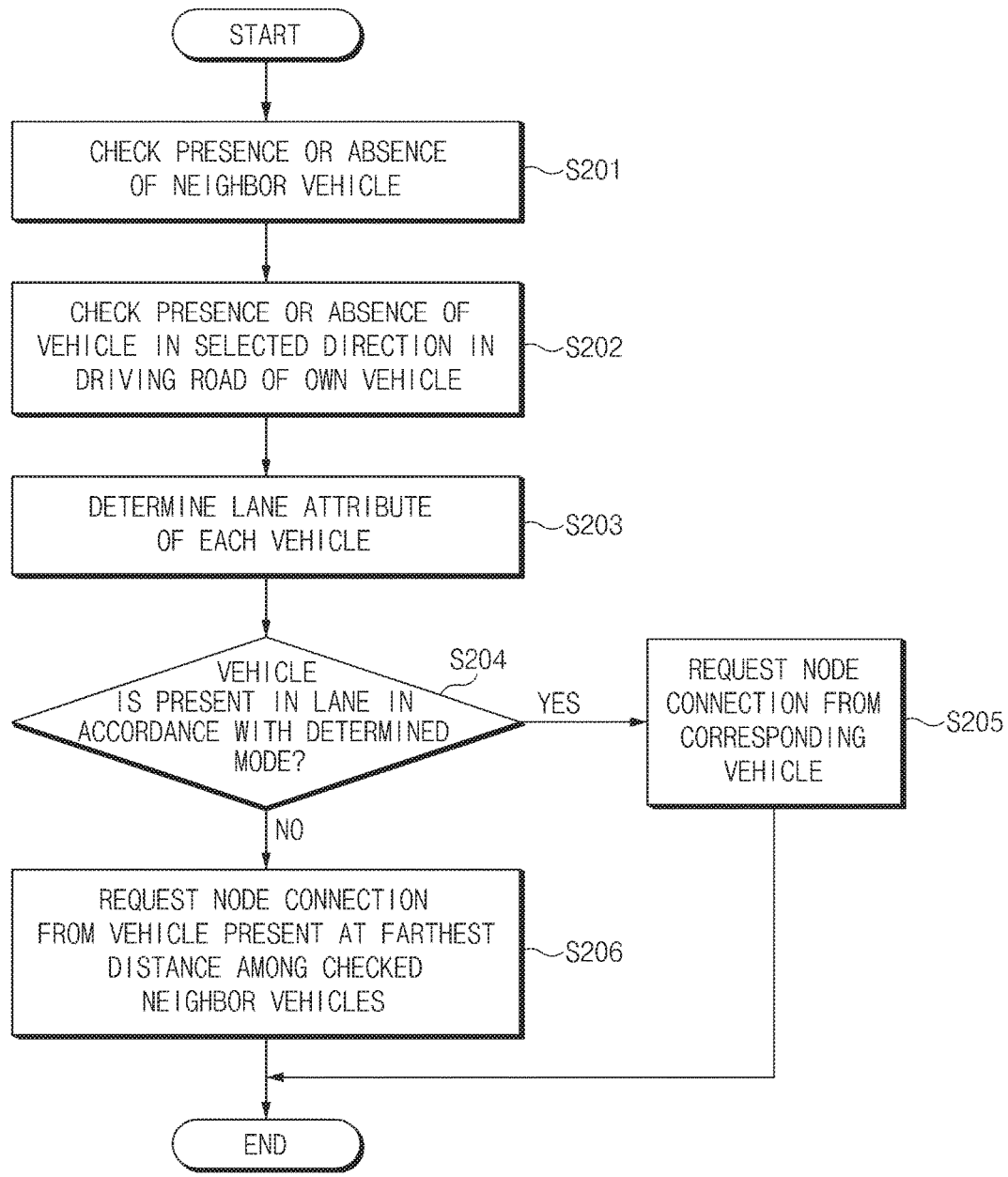
FIG. 3 is a flow chart specifically illustrating an operation of determining whether a neighbor vehicle corresponding to a mode of FIG. 2 is present.

As shown in FIG. 3, first, the controller 130 checks the presence or absence of a neighbor vehicle from the neighbor vehicle detection result from the driving vehicle detector 110 in operation S201. Here, a neighbor vehicle is detected within a detection range of the sensor or a communication available range.

Thereafter, the controller 130 determines the presence or absence of a vehicle in a lane in accordance with a mode determined in a driving road of the host vehicle from the lane detection result from the lane detector 120 and the neighbor vehicle detection result from the driving vehicle detector 110 in operation S202.

Thereafter, the controller 130 determines a lane attribute of the vehicle present in the lane in accordance with the determined mode in operation S203. Here, the lane attribute refers to information of the lane in which the corresponding vehicle is positioned.

Thereafter, the controller 130 determines whether a vehicle is present in the lane in accordance with the mode determined using the lane attribute in operation S204. When a vehicle is present in the lane in accordance with the determined mode, the controller 130 requests node connection from the corresponding vehicle in operation S205.

If, however, a vehicle is not present in the lane in accordance with the determined mode, the controller 130 requests node connection from a vehicle present at the farthest distance among neighbor vehicles checked in the operation S201, in operation S206.

Figure 4:
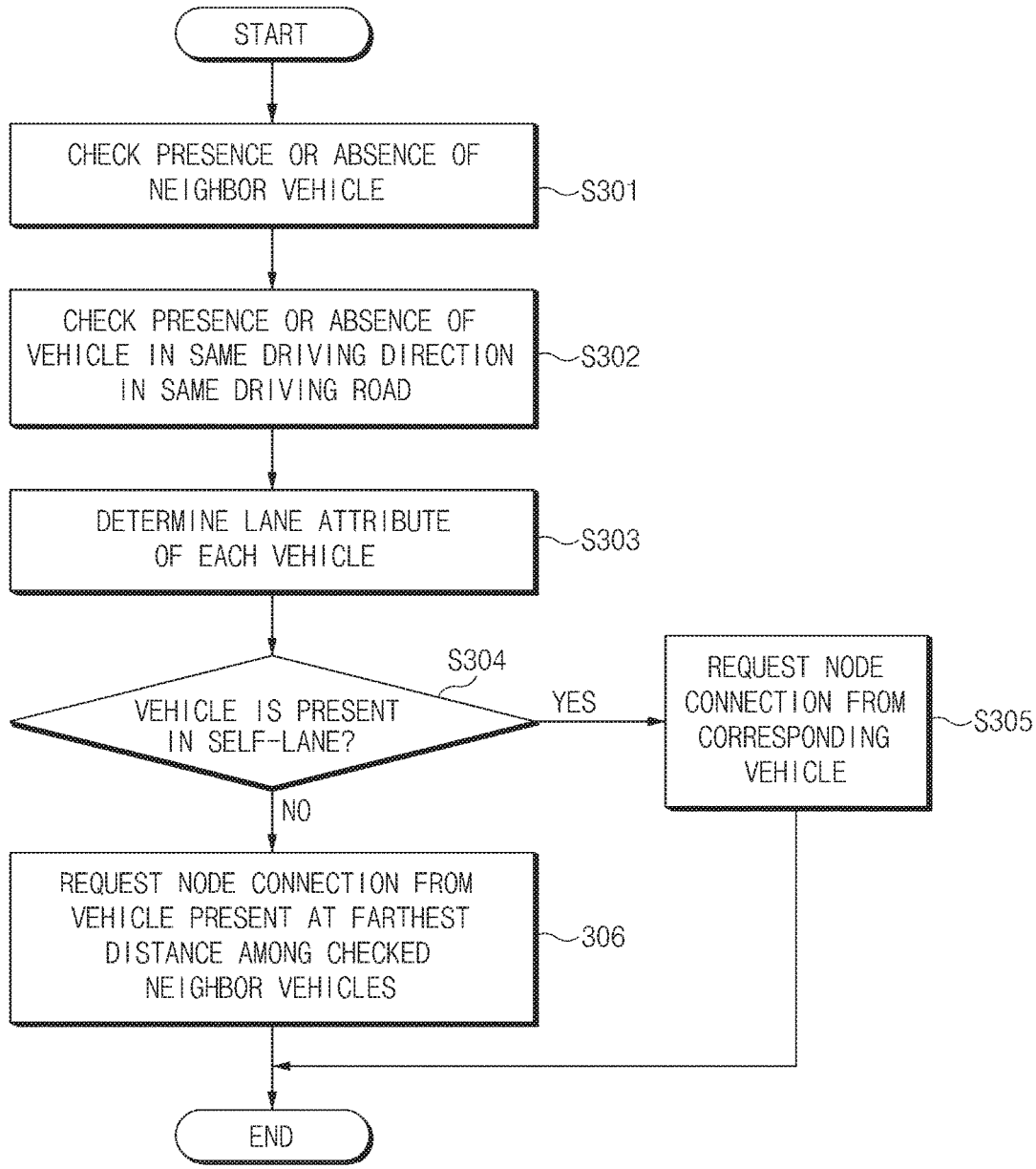
FIG. 4 is a flow chart illustrating a method for configuring a node tree through detection of a vehicle of a self-lane according to embodiments of the present disclosure.

Hereinafter, a method for configuring a node tree through detection of a vehicle driving in a self-lane according to embodiments of the present disclosure will be described with reference to FIG. 4. FIG. 4 illustrates a method for configuring a node tree in a self-lane vehicle detection mode.

As shown in FIG. 4, the controller 130 of the host vehicle (HV) 1 checks the presence or absence of a neighbor vehicle from the neighbor vehicle detection result from the driving vehicle detector 110 in operation S301. Here, a neighbor vehicle is detected within a detection range of the sensor or a communication available range. Referring to FIG. 5, the system 100 for configuring a node tree of the host vehicle 1 detects vehicles 2 and 7 within a detection range of the sensor or a communication available range.

Thereafter, the controller 130 of the host vehicle 1 checks the presence or absence of a vehicle in the same driving direction in the same driving road according to the mode, i.e., a self-lane vehicle detection mode, determined in the driving road of the host vehicle from the vehicle lane detection result from the vehicle lane detector 120 and the neighbor vehicle detection result from the driving vehicle detector 110 in operation S302. Referring to FIG. 5, the system 100 for configuring a node tree of the host vehicle 1 determines vehicles 2 and 7 as vehicles of the same driving direction in the same driving road.

Thereafter, the controller 130 of the host vehicle 1 determines a lane attribute of each vehicle in operation S303. Here, the lane attribute refers to information of a lane in which the corresponding vehicles are positioned. Referring to FIG. 5, it can be seen that the vehicle 2, a neighbor vehicle, is positioned in a second lane, a self-lane, and the vehicle 7, a neighbor vehicle, is positioned in a first lane with respect to the centerline 21.

Thereafter, the controller 130 of the host vehicle 1 determines whether a vehicle is present in the self-lane using a lane attribute in operation S304, and when a vehicle is present in the self-lane, the controller 130 requests node connection from the corresponding vehicle in operation S305. Referring to FIG. 5, the controller 130 determines that the vehicle 2 is present in the self-lane and the host vehicle 1 requests node connection from the vehicle 2. Accordingly, the vehicle 2 repeats the aforementioned operations S301 to S304 and requests node connection from the vehicle 3, and the vehicle 3 repeats the operations S301 to S304.

If, however, a vehicle is not present in the self-lane, the controller 130 requests node connection from a vehicle present at the farthest distance among neighbor vehicles checked in operation S301, in operation S306. Referring to FIG. 5, for example, if the vehicle 2 is not present, the host vehicle 1 may request node connection from the vehicle 7 positioned at the farthest distance among the checked neighbor vehicles. In the case of the vehicle 3, since a neighbor vehicle detected in the same driving direction on the front side in the self-lane is not present, the vehicle 3 requests node connection from the vehicle 4. Thus, the vehicle 4 repeats the operations S301 to S304 to request node connection from a vehicle 5, and the vehicle 5 also repeats the operations S301 to S304 to request node connection from a vehicle 6, a next vehicle. Thereafter, in the case of the vehicle 6, since there is no vehicle detected on a front side thereof, the vehicle 6 transmits node connection information to the vehicle 5, the vehicle 5 transmits the node connection information from the vehicle 6 and node connection information of its own to the vehicle 4, the vehicle 4 transmits the node connection information from the vehicles 5 and 6 and node connection information of its own to the vehicle 3, the vehicle 3 transmits the node connection information from the vehicles 4, 5, and 6 and node connection information of its own to the vehicle 2, and the vehicle 2 transmits the node connection information from the vehicles 3, 4, 5, and 6 and node connection information of its own to the vehicle 1.

Accordingly, the vehicle 1 configures a node tree using the received node connection information.

A method for configuring a node tree through detection of a vehicle driving in the opposite lane according to embodiments of the present disclosure will be described with reference to FIG. 6. Specifically, FIG. 6 illustrates a method for configuring a node tree in the opposite lane vehicle detection mode.

Figure 6:
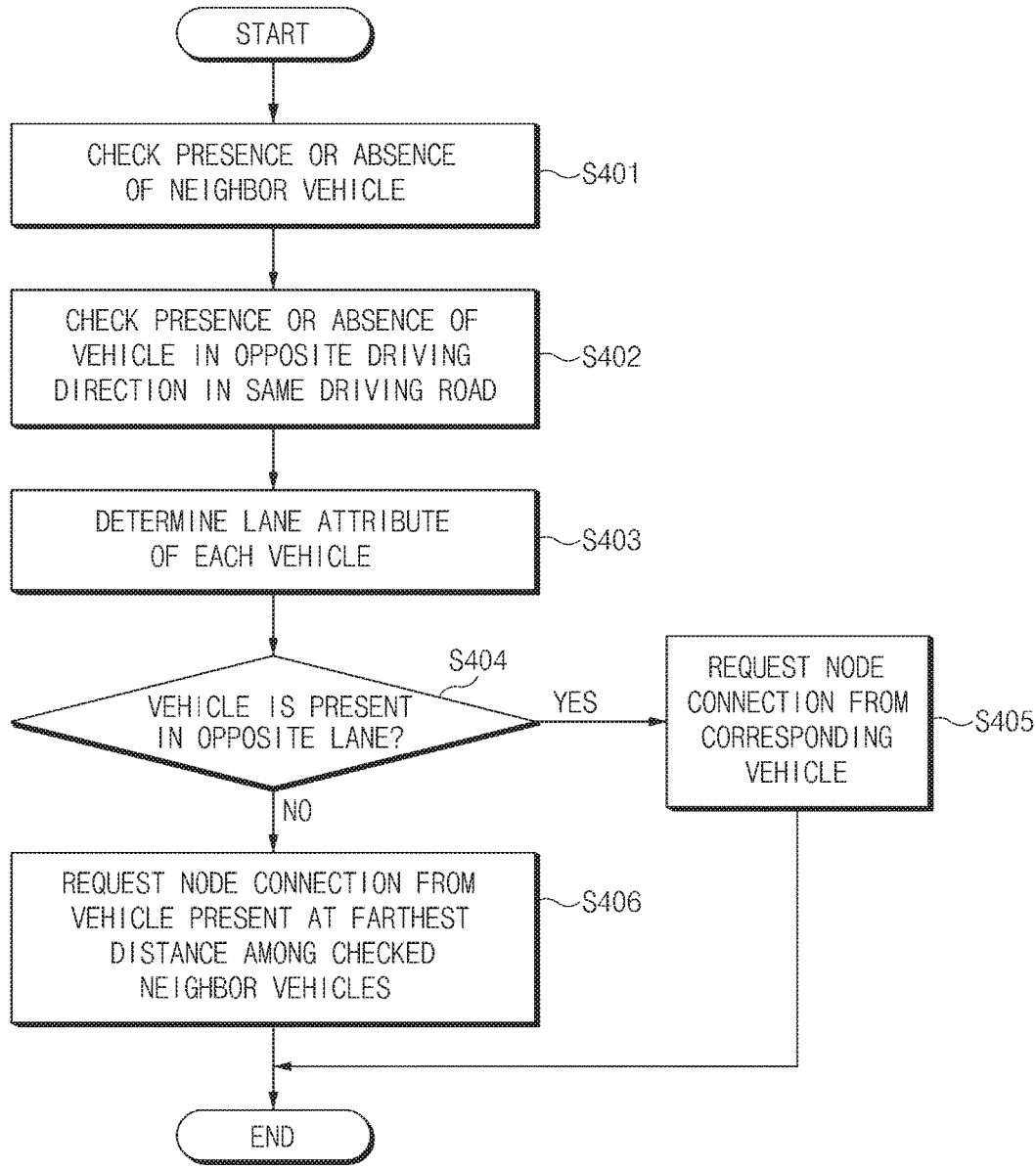
FIG. 6 is a flow chart illustrating a method for configuring a node tree through detection of a driving vehicle of the opposite lane according to embodiments of the present disclosure.

As shown in FIG. 6, the controller 130 of the host vehicle 1 determines the presence or absence of a neighbor vehicle from the neighbor vehicle detection result from the driving vehicle detector 110 in operation S401. Here, a neighbor vehicle is detected within a detection range of the sensor or a communication available range. Referring to FIG. 7, the system 100 for configuring a node tree of the host vehicle (HV) 1 detects vehicles 2, 7, and 8 within a detection range of the sensor or a communication available range.

Thereafter, the controller 130 of the host vehicle 1 checks the presence or absence of a vehicle in the opposite direction in the same driving road according to the mode, i.e., an opposite lane detection mode, determined in the driving road of the host vehicle 1 from the vehicle lane detection result from the vehicle lane detector 120 and the neighbor vehicle detection result from the driving vehicle detector 110 in operation S402. Referring to FIG. 7, the system 100 for configuring a node tree of the host vehicle 1 determines vehicles 2 and 7 as vehicles in the opposite driving direction with respect to the centerline 21 in the same driving road.

Thereafter, the controller 130 of the host vehicle 1 determines a lane attribute of each vehicle in operation S403. Here, the lane attribute refers to information of a lane in which the corresponding vehicles are positioned. Referring to FIG. 7, the host vehicle 1 checks that the vehicle 2, a neighbor vehicle, is driving in a first lane of the opposite lane and the vehicle 7, a neighbor vehicle, is driving in a second lane of the opposite lane.

Thereafter, the controller 130 determines whether a vehicle is present in the first lane of the opposite lane using a lane attribute in operation S404. When a vehicle is present on the rear side in the first lane of the opposite lane, the controller 130 requests node connection from the corresponding vehicle in operation S405. Referring to FIG. 7, the controller 130 determines that the vehicle 2 is present in the first lane of the opposite lane and the host vehicle 1 requests node connection from the vehicle 2. Accordingly, the vehicle 2 repeats the aforementioned operations S401 to S404 and requests node connection from the vehicle 3, and the vehicle 3 repeats the operations S401 to S404.

If, however, a vehicle is not present in the first lane of the opposite lane, the controller 130 requests node connection from a vehicle present at the farthest distance among neighbor vehicles checked in operation S401, in operation S406. Referring to FIG. 7, for example, if the vehicle 2 is not present, the host vehicle 1 may request node connection from the vehicle 7 positioned at the farthest distance among the checked neighbor vehicles. In the case of the vehicle 2, since a neighbor vehicle detected in the same driving direction on the rear side in the first lane of the opposite lane is not present, the vehicle 2 requests node connection from the vehicle 4. Thus, the vehicle 4 repeats the operations S401 to S404 to request node connection from a vehicle 5, a next vehicle. Thereafter, in the case of the vehicle 5, since there is no vehicle detected on a rear side thereof, the vehicle 5 transmits node connection information of its own to the vehicle 4, the vehicle 4 transmits the node connection information from the vehicle 5 and node connection information of its own to the vehicle 3, the vehicle 3 transmits the node connection information from the vehicles 4 and 5 and node connection information of its own to the vehicle 2, and the vehicle 2 transmits the node connection information from the vehicles 3, 4, and 5 and node connection information of its own to the vehicle 1. Accordingly, the vehicle 1 configures a node tree using the received node connection information.

A method for configuring a node tree through detection of a vehicle driving in the left/right lane according to an exemplary embodiment of the present disclosure will be described with reference to FIG. 8. Specifically, FIG. 8 illustrates a method for configuring a node tree in the left/right lane vehicle detection mode.

Figure 8:
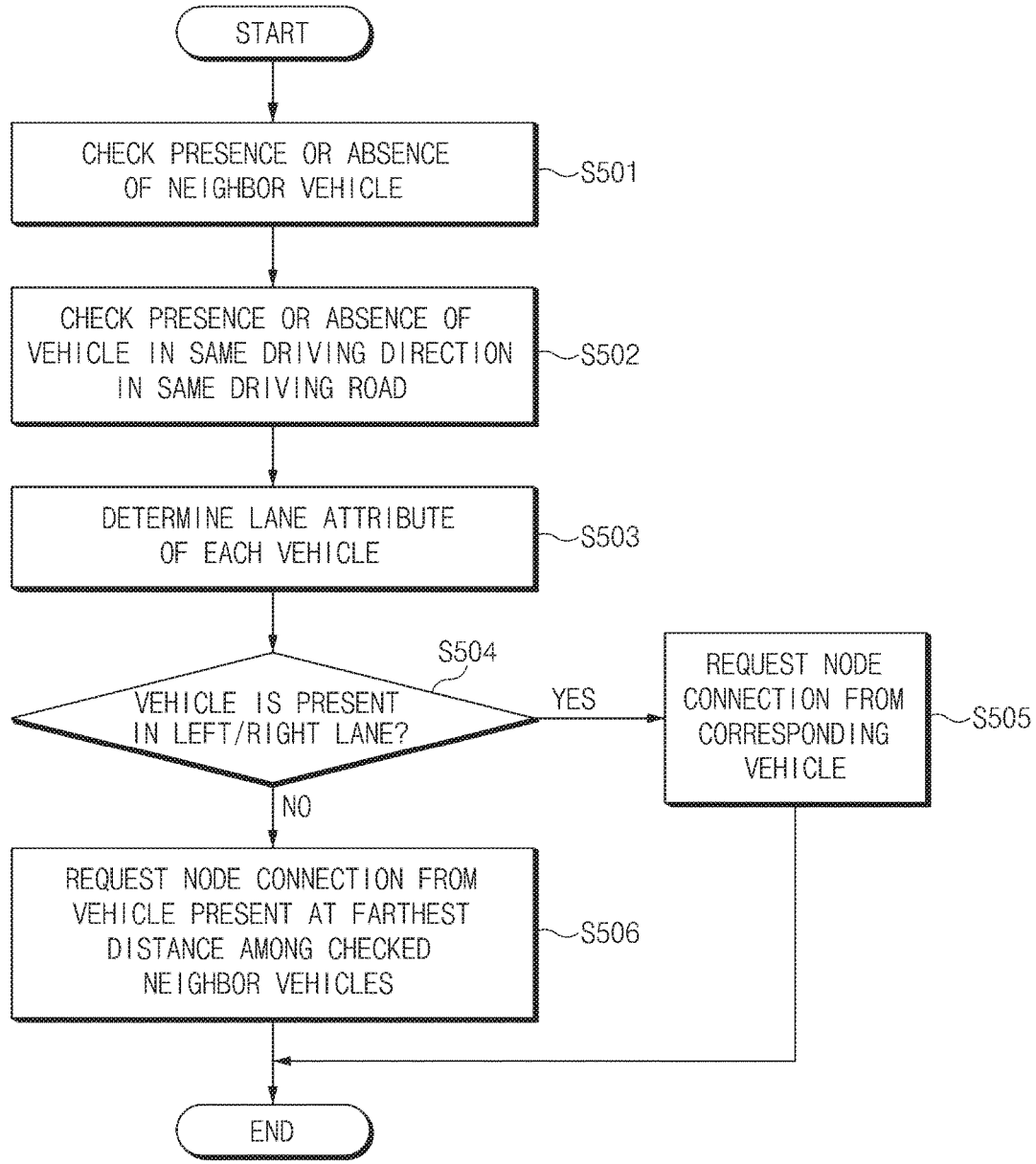
FIG. 8 is a flow chart illustrating a method for configuring a node tree through detection of a vehicle on the left and right lanes according to embodiments of the present disclosure.

As shown in FIG. 8, the controller 130 of the host vehicle 1 determines the presence or absence of a neighbor vehicle from the neighbor vehicle detection result from the driving vehicle detector 110 in operation S501. Here, a neighbor vehicle is detected within a detection range of the sensor or a communication available range. Referring to FIG. 9, the system 100 for configuring a node tree of the host vehicle 1 detects vehicles 2, 4, and 10 within a detection range of the sensor or a communication available range.

Thereafter, the controller 130 of the host vehicle 1 checks the presence or absence of a vehicle in the same driving direction in the same driving road according to the mode, i.e., a left/right lane vehicle detection mode, determined in the driving road of the host vehicle from the vehicle lane detection result from the vehicle lane detector 120 and the neighbor vehicle detection result from the driving vehicle detector 110 in operation S502. Referring to FIG. 9, the system 100 for configuring a node tree of the host vehicle 1 determines vehicles 2, 4, and 10 as vehicles in the same driving direction in the same driving road.

Thereafter, the controller 130 of the host vehicle 1 determines a lane attribute of each vehicle in operation S503. Here, the lane attribute refers to information regarding a lane in which a corresponding vehicle is positioned. Referring to FIG. 9, the host vehicle 1 determines that the vehicle 2, a neighbor vehicle, is positioned in the first lane, the vehicle 10 is positioned in the second lane, the self-lane, and the vehicle 4 is positioned in the third lane, with respect to the centerline 21.

Thereafter, the controller 130 of the host vehicle 1 determines whether a vehicle is present in the left and right lanes using a lane attribute in operation S504. When a vehicle is present on the left and right lanes, the controller 130 requests node connection from the corresponding vehicle in operation S505. Referring to FIG. 9, the vehicle 2 is present in the first lane, a left lane, and the vehicle 4 is present in the second lane, a right lane, with respect to the second lane as a self-lane. Accordingly, the vehicle 2 repeats the aforementioned operations S501 to S504 and requests node connection from the vehicle 3, a next vehicle, and the vehicle 4 also simultaneously repeats the operations S501 to S504 and requests node connection from the vehicle 5, a next vehicle.

If, however, a vehicle is not present in the left and right lanes, the controller 130 requests node connection from a vehicle present at the farthest distance among neighbor vehicles checked in operation S501, in operation S506. Referring to FIG. 9, for example, if the vehicles 2 and 4 are not present, the host vehicle 1 may request node connection from the vehicle 10 positioned at the farthest distance among the checked neighbor vehicles. In the case of the vehicle 3, since a neighbor vehicle detected in the same driving direction on the front side is not present, the vehicle 3 requests node connection from the vehicle 5. Thus, the vehicle 4 repeats the operations S501 to S504 to request node connection from a vehicle 5, a next vehicle, and the vehicle 5 also repeats the operations S501 to S504 to request node connection from the vehicles 6 and 7, next vehicles. Thereafter, the vehicles 6 and 7 request node connection from the vehicle 8 on the front side thereof and the vehicle 8 requests node connection from the vehicle 9 on the front side thereof, and in the case of the vehicle 9, since there is no vehicle detected on a front side thereof, the vehicle 9 transmits node connection information to the vehicle 8, the vehicle 8 transmits the node connection information from the vehicle 9 and node connection information of its own to the vehicles 6 and 7, the vehicles 6 and 7 transmit the node connection information from the vehicles 8 and 9 and node connection information of their own to the vehicle 5, the vehicle 5 transmits the node connection information from the vehicles 6, 7, 8, and 9 and node connection information of its own to the vehicles 3 and 4, the vehicle 3 transmits the node connection information from the vehicles 5, 6, 7, 8, and 9 and node connection information of its own to the vehicle 2, the vehicle 2 transmits the node connection information from the vehicles 3, 5, 6, 7, 8, and 9 and node connection information of its own to the vehicle 1, and the vehicle 4 transmits the node connection information from the vehicles 5, 6, 7, 8, and 9 and node connection information of its own to the vehicle 1. Accordingly, the vehicle 1 configures a node tree using the received node connection information.

Figure 10:
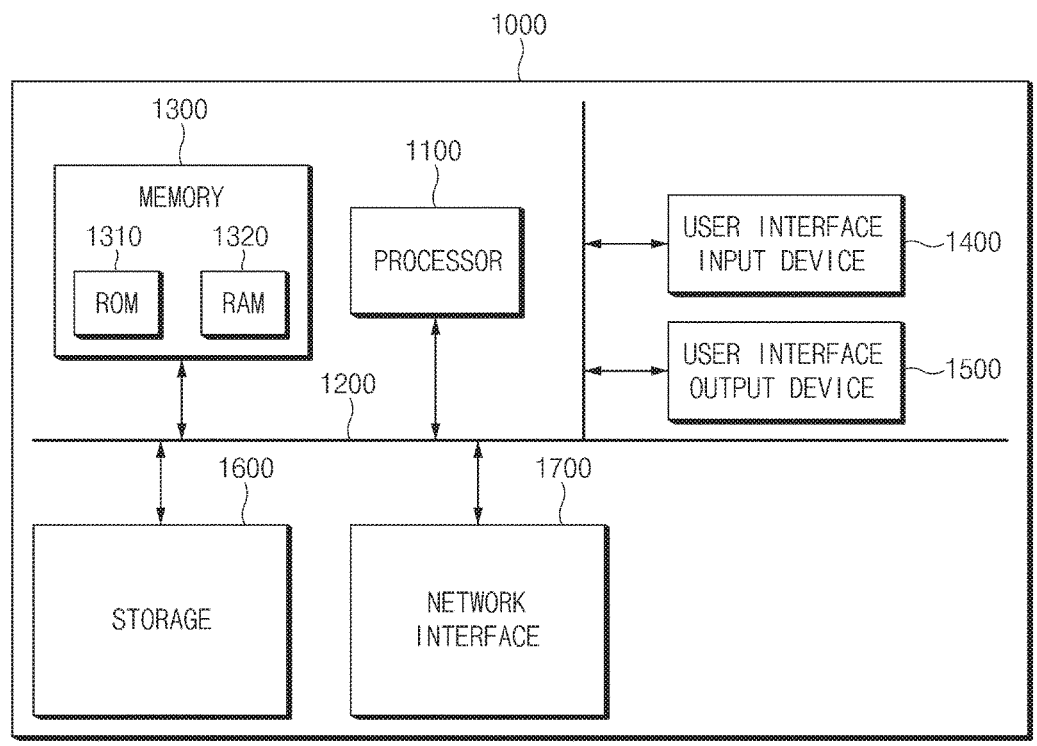
FIG. 10 is a view illustrating a configuration of a computing system employing a lane node tree configuration technique according to embodiments of the present disclosure.

FIG. 10 is a view illustrating a configuration of a computing system employing a lane node tree configuration technique according to embodiments of the present disclosure.

As shown in FIG. 10, a computing system 1000 may include at least one processor 1100, a memory 1300, a user interface input device 1400, a user interface output device 1500, a storage 1600, and a network interface 1700 connected through a bus 1200.

The processor 1100 may be a semiconductor device executing processing regarding commands stored in a central processing unit (CPU) or the memory 1300 and/or the storage 1600. The memory 1300 and the storage 1600 may include various types of volatile or non-volatile storage mediums. For example, the memory 1300 may include a read-only memory (ROM) and a random access memory (RAM).

The methods or algorithms described in relation to embodiments disclosed in the present disclosure may be embodied directly in hardware, in a software module executed by a processor 1100, or a combination of the two. A software module may reside in storage medium (i.e., a memory 1300 and/or storage 1600) such as RAM memory, a flash memory, ROM memory, an EPROM memory, an EEPROM memory, registers, hard disk, a removable disk, or a CD-ROM.

An exemplary storage medium is coupled to a processor 1100, and the processor 1100 can read information from, and write information to, the storage medium. In another method, the storage medium may be integrated with the processor 1100. The processor and the storage medium may reside in an application-specific integrated circuit (ASIC). The ASIC may reside in a user terminal. Otherwise, the processor and the storage medium may reside as discrete components in a user terminal.

As described above, the present technique configures a node tree based on neighbor vehicles by detecting neighbor vehicles according to driving of vehicles, whereby a data communication load may be reduced in a multi-hop environment and the node tree may be applied to various user convenience systems.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for configuring a lane node tree, the system comprising:
    a host vehicle; and
    a controller disposed in the host vehicle and including a memory configured to store program instructions and a processor configured to execute the stored program instructions, which when executed cause the controller to:
       select a driving vehicle detection mode among a plurality of driving vehicle detection modes according to a driving application that is executed by the host vehicle, wherein the plurality of driving vehicle detection modes includes a self-lane mode for detecting a vehicle in a lane in which the host vehicle is present, an opposite lane mode for detecting a vehicle in an opposite lane of the lane in which the host vehicle is present, and a left/right lane mode for detecting a vehicle in a left lane or a right lane with respect to the lane in which the host vehicle is present;
       select a lane of a road according to the selected driving vehicle detection mode;
       determine whether a neighbor vehicle neighboring the host vehicle is present in the selected lane; and
       request a node connection from a neighbor vehicle present in the selected lane when the neighbor vehicle is determined to be present in the selected lane, wherein
    when the selected driving vehicle detection mode is the self-lane mode, the controller configures the lane node tree using connection information regarding at least one node received from the neighbor vehicle present in the lane in which the host vehicle is present,
    when the selected driving vehicle detection mode is the opposite lane mode, the controller configures the lane node tree using connection information regarding at least one node received from the neighbor vehicle present in the opposite lane of the lane in which the host vehicle is present, and
    when the selected driving vehicle detection mode is the left/right lane mode, the controller configures the lane node tree using connection information regarding at least one node received from the neighbor vehicle present in the left lane or the right lane with respect to the lane in which the host vehicle is present.

2. The system according to claim 1, wherein the controller detects the neighbor vehicle neighboring the host vehicle, and detects a lane of the road.

3. The system according to claim 1, wherein:
    the self-lane mode is selected when at least one of a forward collision warning (FCW) application and an emergency electronic brake light (EEBL) application is executed,
    the opposite lane mode is selected when at least one of a vehicle-to-everything (V2V) information fusion cooperative adaptive cruise control (CACC) application and a do not pass warning (DNPW) application is executed, and the left/right lane mode is selected when a blind spot warning (BSW) application is executed.

4. The system according to claim 1, wherein when the self-lane mode is selected, the controller determines a lane attribute of a vehicle driving on the road in the same driving direction as the host vehicle and determines whether the vehicle is present in the lane in which the host vehicle is present.

5. The system according to claim 4, wherein when the vehicle is present in the lane in which the host vehicle is present, the controller requests the node connection from the vehicle present in the lane in which the host vehicle is present.

6. The system according to claim 4, wherein when the vehicle is not present in the lane in which the host vehicle is present, the controller requests the node connection from a vehicle at a farthest distance from the host vehicle among a plurality of vehicles driving in the same driving direction as the host vehicle.

7. The system according to claim 1, wherein when the opposite lane mode is selected, the controller determines a lane attribute of a vehicle driving on the road in the opposite driving direction as the host vehicle and determines whether the vehicle is present in the opposite lane of the lane in which the host vehicle is present.

8. The system according to claim 7, wherein the controller requests the node connection from the vehicle present in the opposite lane.

9. The system according to claim 1, wherein when the left/right lane mode is selected, the controller determines a lane attribute of a vehicle driving on the road in the same driving direction as the host vehicle and determines whether the vehicle is present in a left lane or a right lane with respect to the lane in which the host vehicle is present.

10. The system according to claim 9, wherein the controller requests the node connection from the vehicle present in the left lane or the right lane with respect to the lane in which the host vehicle is present.

11. A method for configuring a lane node tree using a controller disposed in a host vehicle and including a memory configured to store program instructions and a processor configured to execute the stored program instructions, the method comprising:
selecting, by the controller, a driving vehicle detection mode among a plurality of driving vehicle detection modes according to a driving application that is executed by the host vehicle, wherein the plurality of driving vehicle detection modes includes a self-lane mode for detecting a vehicle in a lane in which the host vehicle is present, an opposite lane mode for detecting a vehicle in an opposite lane of the lane in which the host vehicle is present, and a left/right lane mode for detecting a vehicle in a left lane or a right lane with respect to the lane in which the host vehicle is present;
selecting, by the controller, a lane of a road according to the selected driving vehicle detection mode;
determining, by the controller, whether a neighbor vehicle neighboring the host vehicle is present in the selected lane;
requesting, by the controller, a node connection from a neighbor vehicle present in the selected lane when the neighbor vehicle is determined to be present in the selected lane;
when the selected driving vehicle detection mode is the self-lane mode, configuring, by the controller, the lane node tree using connection information regarding at least one node received from the neighbor vehicle present in the lane in which the host vehicle is present;
when the selected driving vehicle detection mode is the opposite lane mode, configuring, by the controller, the lane node tree using connection information regarding at least one node received from the neighbor vehicle present in the opposite lane of the lane in which the host vehicle is present; and
when the selected driving vehicle detection mode is the left/right lane mode, configuring, by the controller, the lane node tree using connection information regarding at least one node received from the neighbor vehicle present in the left lane or the right lane with respect to the lane in which the host vehicle is present.

12. The method according to claim 11, further comprising:
requesting, by the controller, node connection from another neighbor vehicle on the road when the neighbor vehicle is not present in the selected lane.

13. The method according to claim 12, wherein the requesting of the node connection from another neighbor vehicle on the road comprises requesting, by the controller, the node connection from a vehicle at a farthest distance from the host vehicle among a plurality of vehicles driving in the same driving direction as the host vehicle.

14. The method according to claim 11, wherein the plurality of driving vehicle detection modes includes a self-lane mode for detecting a vehicle in a lane in which the host vehicle is present, an opposite lane mode for detecting a vehicle in an opposite lane of the lane in which the host vehicle is present, and a left/right lane mode for detecting a driving vehicle of a left or right lane with respect to the lane in which the host vehicle is present.

15. The method according to claim 14, further comprising:
determining, by the controller, a lane attribute of a vehicle driving on the road in the same driving direction as the host vehicle and determining whether the vehicle is present in the lane in which the host vehicle is present, when the self-lane mode is selected;
determining, by the controller, a lane attribute of a vehicle driving on the road in the opposite driving direction as the host vehicle and determining whether the vehicle is present in the opposite lane of the lane in which the host vehicle is present, when the opposite lane mode is selected; and
determining, by the controller, a lane attribute of a vehicle driving on the road in the same driving direction as the host vehicle and determining whether the vehicle is present in a left lane or a right lane with respect to the lane in which the host vehicle is present, when the left/right lane mode is selected.

16. A method for configuring a lane node tree, the method comprising:
selecting, by a first vehicle, a first driving vehicle detection mode among a plurality of driving vehicle detection modes according to a driving application that is executed by the first vehicle, wherein the plurality of driving vehicle detection modes includes a self-lane mode for detecting a vehicle in a lane in which the first vehicle is present, an opposite lane mode for detecting a vehicle in an opposite lane of the lane in which the first vehicle is present, and a left/right lane mode for detecting a vehicle in a left lane or a right lane with respect to the lane in which the first vehicle is present;

selecting, by the first vehicle, a first lane of a road according to the selected first driving vehicle detection mode;

determining, by the first vehicle, whether a second vehicle is present in the selected first lane;

requesting, by the first vehicle, a node connection from a second vehicle present in the selected lane when the second vehicle is determined to be present in the selected lane;

selecting, by the second vehicle, a second driving vehicle detection mode among the plurality of driving vehicle detection modes;

selecting, by the second vehicle, a second lane of the road according to the selected second driving vehicle detection mode;

determining, by the second vehicle, whether a vehicle is present in the selected second lane;

when a vehicle is not present in the selected second lane, determining, by the second vehicle, whether a vehicle is present in another lane;

when a vehicle is not present in the other lane, transmitting, by the second vehicle, node connection information to the first vehicle; and configuring, by the first vehicle, the lane node tree using the node connection information, wherein the configuring of the lane node tree comprises:
when the first selected driving vehicle detection mode is the self-lane mode, configuring, by the first vehicle, the lane node tree using the node connection information received from the second vehicle present in the lane in which the first vehicle is present;

when the first selected driving vehicle detection mode is the opposite lane mode, configuring, by the first vehicle, the lane node tree using the node connection information received from the second vehicle present in the opposite lane of the lane in which the first vehicle is present; and when the first selected driving vehicle detection mode is the left/right lane mode, configuring, by the first vehicle, the lane node tree using the node connection information received from the second vehicle present in the left lane or the right lane with respect to the lane in which the first vehicle is present.

17. The method according to claim 16, further comprising:
when the vehicle is present in the other lane, transmitting, by the second vehicle, the node connection information to a vehicle at a farthest distance from the second vehicle among a plurality of vehicles.

* * * * *